June 7, 1955 J. S. JAMMER 2,710,392

SPACE RESERVATION RECORDING SYSTEM

Filed July 14, 1951 2 Sheets-Sheet 1

INVENTOR.

JACOB S. JAMMER

BY Robert Harding Jr.

ATTORNEY.

SPACE RESERVATION RECORDING SYSTEM

Filed July 14, 1951

INVENTOR.

JACOB S. JAMMER

BY Robert Harding Jr.

ATTORNEY.

2,710,392
Patented June 7, 1955

2,710,392

SPACE RESERVATION RECORDING SYSTEM

Jacob S. Jammer, Montclair, N. J., assignor to International Standard Electric Corporation, New York, N. Y., a corporation of Delaware Application July 14, 1951, Serial No. 236,812

7 Claims. (Cl. 340—153)

This invention relates to recording systems of the type in which various items are recorded on a master recorder to be selectively reproduced as desired. Such a recording system may be part of a reservation system where "space available" is recorded on the master recorder and selectively reproduced at one or more stations where space is being sold by an operator. The invention is applicable to recording systems for stock exchange prices, charge account records or stock records and may have many other uses.

One of the objects of the invention is to provide a system in which certain recorded designations on a master recorder can be changed automatically at any time by an operator at a remote point and without the services of an announcer, so that the recorded information may be kept up to date.

Another object of the invention is to provide a recording system in which one of a plurality of operators may automatically alter a particular item recorded on a master recorder while signalling all of the other operators that the record is being changed.

Other objects and objects relating to the arrangement and connections of the circuits involved will be apparent as the description of the invention proceeds.

In its broadest aspect the invention comprises an operator's position, a master recorder having input and output circuits and having designations representative of a plurality of items recorded in succession thereon, each with an item-identifying coded signal adjacent the designation, a plurality of item-selective circuits means at the operator's position for connecting one of these circuits to the output of the master recorder, a plurality of auxiliary recorders, each with a different quantity permanently recorded thereon, means at the operator's position for connecting one of the auxiliary recorders to the master recorder, means in each item-selective circuit for responding to the coded signal for the respective item, and means controlled by the responding means for transferring the connection of the auxiliary recorder from the output circuit of the master recorder to the input circuit thereof and for operating the auxiliary recorder to replace the quantity recorded on the master recorder with that produced by the auxiliary recorder.

Figures 1, 3:
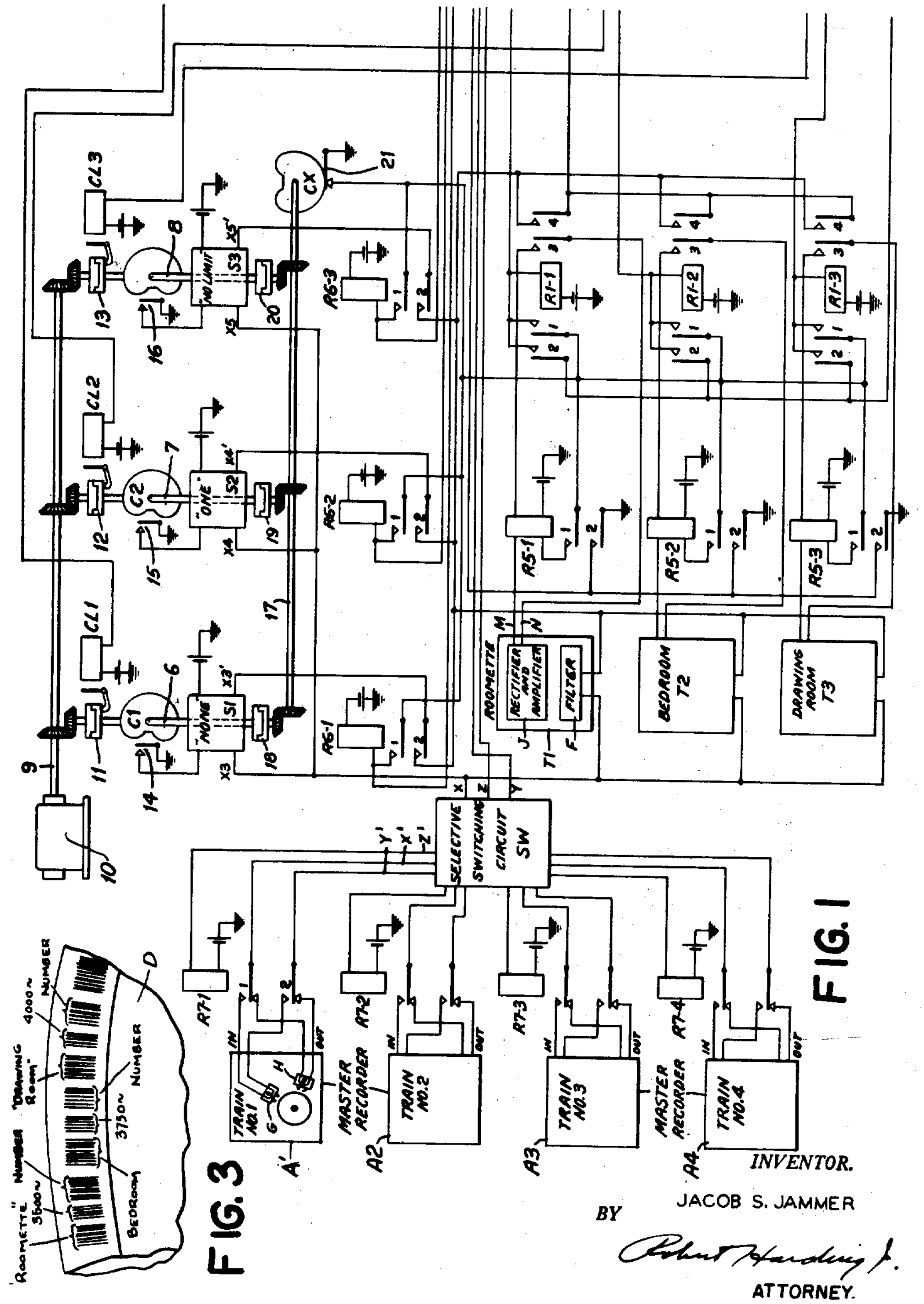
Figure 2:
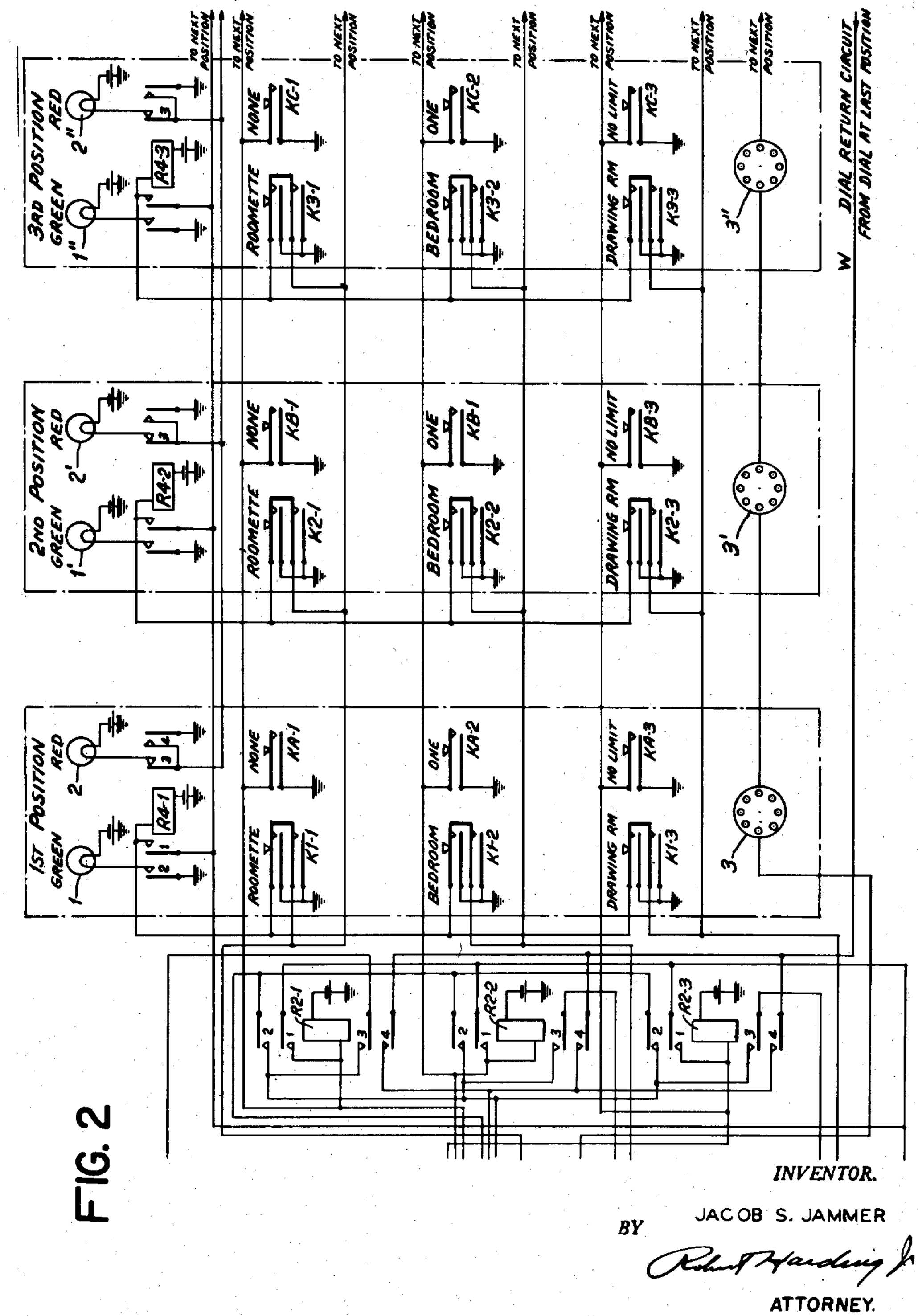

The above-mentioned and other features and objects of the invention and the manner of attaining them will become more apparent, and the invention itself will be best understood, by reference to the following description of an embodiment of the invention taken in conjunction with the accompanying drawings, in which:

Figs. 1 and 2, when placed side by side with Fig. 2 on the right, represent a circuit diagram of a recording system embodying the invention; and Fig. 3 is a schematic fragmentary section of a magnetic drum of one of the master recorders used with the invention.

The invention has been illustrated in connection with a railroad reservation system. Such a system may comprise the circuits and apparatus disclosed in the application of E. M. S. McWhirter and F. G. Popp Serial No. 177,534, filed June 14, 1950, now Patent No. 2,645,764. In such a system a master recorder is provided for each train on which space is to be reserved, and the various types of space for which reservations may be taken, such as upper and lower berths, roomettes, bedrooms, drawing rooms, etc. are orally recorded in succession with the quantity available after each of the space designations. For instance, a reproduction of the recorded subject matter might give the following oral announcement: "Train No. 67 leaving New York for Chicago on Monday, June 25, at 4:30 P. M.; Upper Berths 14; Lower Berths 3; Roomettes 10; Bedrooms 5; Drawing rooms 2." At certain slack periods during the night an announcer alters the various recorded quantities to bring the record up to date. This may be done by merely recording the words "none," "one," "two," "three," "no limit," etc. When an operator is selling space on a particular train she may dial a code number on a simple telephone dial which will automatically connect her by means of well-known telephone connecting circuits to the particular master recorder which represents the described train. The recorder will be continuously operated and therefore the operator will hear the announcement of the available space desired by the customer.

Portions of such a system have been shown in Figs. 1 and 2 with the circuits of the invention connected thereto. Only those portions of the apparatus have been shown which are necessary to a clear understanding of the present invention.

Referring to Figs. 1 and 2 there is shown a plurality of master recorders A1, A2, A3 and A4, representing four different trains upon which space is to be reserved. These master recorders may be of any desired type, as for instance, wire or tape magnetic recorders or magnetic drum recorders which are well known in the art and need not be described in detail. They are of the type in which a signal to be recorded is introduced over an input circuit to the recording head G and will automatically erase anything which has been recorded previously, so that the recording may be changed simply by feeding a signal into the input circuit. The reproducing head H will reproduce the recorded signal.

A selecting switching circuit SW is provided which is connected to all of the master recorders A1 to A4 and is similar to well known telephone selective switching apparatus. By means of this circuit the coded signal delivered, for instance, from a telephone dial over leads X and Y will operate selective devices in the circuit to connect the leads X and Y to a selected one of the master recorders, for instance the recorder A1 over leads X', Y' respectively.

Three operators' positions are shown in Fig. 2 which are normally, as far as the present invention is concerned, disconnected from the selective switching circuit SW. Each of these positions contains a plurality of non-locking keys, there being one for each type of space on the train and one for each designation of the number of spaces available. For instance key K1–1 of position 1 may be used to control the recording of the number of roomettes available; key K1–2 may be used for controlling the recording of the number of bedrooms available; key K1–3 the number of drawing rooms available, and so on, there being a key for each type of space, although only the three keys mentioned have been shown. The corresponding keys in position 2 have been indicated as K2–1, K2–2, K2–3, and those in position 3 have been indicated as K3–1, K3–2 and K3–3.

In the first position, the keys for controlling the quantity of the spaces available have been indicated as KA–1 for "none," KA–2 for "one," KA–3 for "no limit." Any number of these keys will be provided depending on the number of units of a particular type which may be on a train. Corresponding keys in the second and third positions are indicated at KB–1, KB–2, KB–3, and KC–1, KC–2, and KC–3.

The first position also includes a green light 1, a red light 2, and a dial 3. The corresponding lights and dials of the second and third positions have been indicated, respectively, at 1′, 2′, 3′ and 1″, 2″, and 3″. Relays R4–1, R4–2, and R4–3 are provided, respectively, in the three positions for controlling the green and red lights thereof in a manner to be described later.

A plurality of relays are provided, one for each of the types of spaces. Thus relay R1–1 (Fig. 1) is controlled by key K1–1 which is the roomette key in the example illustrated; relay R1–2 is controlled by key K1–2 and represents the bedroom type of space; while relay R1–3 is controlled by key K1–3 and represents the drawing room space.

In addition there are a plurality of relays, one for each of the quantities which are represented by the keys KA–1, KA–2 and KA–3. These are relays R2–1, R2–2, R2–3 which are controlled respectively by the keys KA–1, 2, and 3.

A plurality of item-selective circuits T1, T2 and T3 (Fig. 1) are provided, one for each of the space types, as for instance, the roomette, bedroom, and drawing room, these circuits being controlled by the relays R1–1, R1–2, and R1–3, respectively. Each of these circuits is designed to respond only when the announcement of its own particular type of space is made and has the function of completing certain circuits at this time. Each of the item-selective circuits has an associated relay which is controlled by it and which starts the operation of a selected auxiliary recorder, as will be explained later. These relays are indicated at R5–1, R5–2 and R5–3 and are respectively associated with circuits T1, T2 and T3.

The auxiliary recorders are shown on Fig. 1 and are indicated at S1, S2, and S3. The auxiliary recorder S1 is arranged to reproduce the word "none" upon complete rotation of shaft 6 extending through the device. The auxiliary recorder S2 is arranged to reproduce the word "one" upon one complete rotation of a shaft 7 extending through it. The auxiliary recorder S3 is arranged to reproduce the words "no limit" upon one complete rotation of a shaft 8 extending through it. As many auxiliary recorders as there are quantity keys will of course be provided.

The shafts 6, 7 and 8 may be selectively driven from a common drive shaft 9 continuously driven by a motor 10. To this end, a clutch 11 connects the shaft 6 to the shaft 9 through suitable bevel gearing. This clutch is controlled by a clutch magnet CL1. Similarly, a clutch 12 connects the shaft 7 to the shaft 9 and a clutch 13 connects the shaft 8 to the shaft 9, both through suitable bevel gearing, and these clutches are controlled respectively, by clutch magnets CL2 and CL3. The clutch magnets CL1, CL2 and CL3 are controlled respectively by relays R2–1, R2–2, and R2–3 in a manner which will be described later.

The auxiliary recorder S1 is energized by means of a cam C1 mounted on the shaft 6 and shaped so as to close a contact 14 after the shaft 6 starts to rotate. The closing of the contact 14 completes a circuit through the recorder S1 which causes it to send electrical variations over its output leads X3 and X3′ representing the word "none." Similarly, the auxiliary recorder S2 is energized by means of a cam C2 mounted on shaft 7 which operates a contact 15, the cam being shaped so as to energize the recorder after the shaft has started to rotate, whereupon electrical variations representing the word "one" are delivered from the leads X4 and X4′. The auxiliary recorder S3 is similarly energized by means of a cam C3 mounted on shaft 8 which operates a contact 16 after the shaft 8 has started to rotate, thus delivering from the leads X5 and X5′ electrical variations representing the words "no limit."

It will be understood that any number of these auxiliary recorders may be used depending on the quantities which are to be recorded on the master recorders.

The shafts 6, 7, and 8 are connected to another shaft 17 by means of one-way clutches 18, 19 and 20, respectively, which ensure the rotation of shaft 17 when any one of shafts 6, 7 and 8 are rotated. Suitable bevel gears connect the clutch members 18, 19 and 20 with the shaft 17. On the end of the shaft 17 is mounted a cam CX which controls a contact 21. This cam is so shaped that the contact 21 is normally closed but will open a predetermined time after the rotation of the shaft 17 is started when a low point on the cam reaches the movable armature of the contact 21. The contact 21 normally supplies ground for locking the various relays in the circuit for a predetermined time and releasing them after the recording has been accomplished to return the circuit to normal, as will be described later.

The auxiliary recorders S1, S2 and S3 are respectively provided with relays R6–1, R6–2 and R6–3, which relays are used for connecting the associated auxiliary recorders to the master recorders and are controlled respectively by the relays R2–1, R2–2, and R2–3 in a manner to be later described.

Each of the master recorders is provided with an input circuit and an output circuit. The output circuit, indicated by the word "out," is normally connected over the back contacts of an associated relay to the selective switch circuit SW. Thus, recorder A1 is connected over the back contacts of relay R7–1 to the circuit SW, the recorder A2 is connected over the back contacts of relay R7–2 to the circuit SW, the recorder A3 is connected over the back contacts of relay R7–3 to the circuit SW, and the recorder A4 is connected over the back contacts of relay R7–4 to the circuit SW. When any of these relays R7–1 to R7–4 is operated, the connection to the circuit SW from the recorder associated with the operated R7 relay is transferred from the recorder output circuit to the input circuit, the input circuit in each case being connected to make contacts of the associated relay.

Having thus briefly described the various components of the apparatus, the operation thereof will now be described.

Suppose the operator in the first position has ascertained from the master recorder A1 of train number 1, in a mannner forming no part of the present invention, that there are two roomettes available, and she desires to reserve one of them which would then leave one available. She then wishes to change the recording on the master recorder to indicate that there is only one roomette available instead of the two which was recorded thereon. In order to accomplish this, she will first depress roomette key K1–1. This will connect ground over the lower make contact of the key to the winding of relay R1–1 to operate this relay. Relay R1–1 locks over its number 1 contact, contact 21 of cam CX, to ground. Relay R4–1 also operates in a circuit from ground over the upper contact of key K1–1, winding of relay R4–1, to battery and ground. The operation of relay R1–1 provides a locking circuit for relay R4–1 over the latter's make contact 1, make contacts 2 and 1 of relay R1–1, contact 21 of cam CX, to ground.

The operation of relay R4–1 operates green light 1 from ground over contact 2 of the relay in an obvious circuit. However, the circuit of the red light 2 is disconnected at break contact 3 of relay R4–1 so that it can not possibly light while relay R4–1 is operated. Red lights 2′ and 2″ are both operated, as well as the red lights of any other operators' positions, over a circuit from ground in the 1st operator's position, make contact 4 of R4–1 and break contacts 3 of relays R4–2, R4–3, etc. of the other positions. Thus the green light of the first position and the red lights of all of the other positions will be operated, thus warning the other operators that a change is being made on the master recorder so that they will not attempt to make a change during the time that the red lamp is lit at their position.

The release of key K1–1 will now have no further effect on the circuit since relays R1–1 and R4–1 are locked up.

The operator will then depress the KA–2 key representing the word "one" to be recorded. Ground over the contact of key KA–2 will be applied to relay R2–2, thus operating this relay. Relay R2–2 will lock over its number 1 contact, armature number 2 and make contact of relay R1–1, make contact number 1 and armature of relay R1–1, contact 21 of cam CX, to ground.

With relays R1–1 and R2–2 operated, the dials 3, 3′, 3″ and of all other positions are connected in series to the selective switching circuit SW in a circuit including the item-selective circuit T1. This circuit may be traced from lead X at the switching circuit SW through the item-selective circuit T1, number 4 contact and armature of relay R1–1, the dials 3, 3′, 3″, etc., over the return circuit W from the dial of the last position, number 4 armature and contact of relay R2–2 to the Y lead of the switching circuit SW.

The operation of key KA–2 will also operate relay R6–2 which locks over its number 1 contact to the ground on contact 21. With the closing of contact 2 of relay R6–2 the auxiliary recorder S2 which produces the word "one" is connected in parallel with the item-selective circuit T1.

The operator may now dial a code representative of the particular train desired, for instance train number 1, and the selective switching circuit SW will set up connections in a manner well known in the telephone art to the particular master recorder A1. When these connections are completed, the X lead of the circuit SW will be connected to the X′ lead leading over the number 1 armature and break contact of relay R7–1 to one of the output leads of the master recorder A1, and the lead Y of the circuit SW will be connected to the lead Y′ leading over the armature and break contact 2 of relay R7–1 to the other output lead of the master recorder A1. At the same time a circuit is prepared for the operation of relay R7–1. This circuit may be traced from grounded battery on relay R7–1, winding of the relay, lead Z′, switching circuit SW, lead Z, make contact and armature number 2 of relay R2–2 and make contact of relay R5–1 which is not yet operated.

When the relay R2–2 was operated, a circuit was also prepared for the operation of clutch magnet CL2 from grounded battery at the clutch magnet, winding of the magnet, armature 3 and contact of relay R2–2, contact 2 and armature of relay R2–2, to make contact 2 of relay R5–1 which is not operated.

With the output of the master recorder connected to the circuit through the switching circuit SW, the continuously operated master recorder begins to announce the various types of space in sequence followed by the quantity of space available for each particular item. In the arrangement of the invention, the master recorder not only announces the type of space such as "roomette," "bedroom," "drawing room," etc., but after the announcement of the word, an alternating voltage is produced at a frequency which is characteristic of the particular type of space, this frequency being above or below the audible frequency. For instance, this alternating voltage characteristic of roomettes might be 3500 cycles while the frequency characteristic of a bedroom might be 3750 cycles, the frequency characteristic of each type being separated from that of another type by 250 cycles. The recorded voice is represented in Fig. 3 where the magnetic drum D carries the various symbols, as shown. Such item identifying code signal may be produced in any desirable manner, such, for example, as merely applying the frequency to the master recorder at the proper time, the result being that each type of space recorded on the recorder will not only produce a signal which may be reproduced as a word or words identifying the particular spaces, but it will also produce a frequency characteristic of that type of space.

Each of the item selective circuits T1, T2, T3, etc. is made responsive to the particular frequency characteristic of the type of space which it represents. This may be done by a filter F, shown in T1, which feeds a rectifier network and amplifier J which is designed to produce a D. C. voltage across its output when the filter is energized Thus, if a frequency of 3500 cycles is representative of a roomette, the filter F in the item-selective circuit T1 is made responsive to 3500 cycles.

With the circuit connected to the master recorder A1, the continuously driven master recorder will announce the different type spaces in succession, reproducing not only the signal at audible frequencies characteristic of the different types of spaces, but including also the characteristic frequency followed by the quantity of units available in that space. These signals flow in succession through the item-selective circuit T1 and when the roomette announcement is received with its accompanying 3500 cycle frequency, the filter F responds to that frequency, and by means of the rectifier and amplifier J will produce a D. C. voltage across the outlet leads M and N. A circuit is thus completed for the operation of relay R5–1 which may be traced from the lead M at the item-selective circuit T1, winding of R5–1, make contact and armature 3 of relay R1–1, back to lead N at the item-selective circuit T1. Relay R5–1 will operate and lock over its number 1 make contact and armature to the ground on cam CX, and at its number 2 armature, which is connected to ground, and associated make contact, will complete the circuits previously traced for relay R7–1 and clutch magnet CL2.

The operation of relay R7–1 transfers the leads X′ and Y′ to the inlet wires of the master recorder A1 over the make contacts and associated armatures 1 and 2 of relay R7–1. At the same time the clutch 12 is operated by clutch magnet CL2 and the shaft 7 starts to rotate driven by the continuously rotating shaft 9. As soon as the cam C2 has closed contact 15 the auxiliary recorder S2 will be energized, and as the shaft 7 rotates, a signal representing the word "one" will appear across leads X4 and X4′ which, as has been previously described, are connected in the circuit of leads X and Y leading to the master recorder A1 through the switching circuit SW. The effect of this signal will be to remove the previously recorded quantity announcement on the master recorder A1 and in its place record the word "one."

By the time the world "one" has been recorded the shaft 17, operated through the one-way clutch 19, will have rotated the cam CX sufficiently for the depressed portion of the cam to permit the armature 21 to break its contact and thus disconnect the ground from the locking circuits of relays R1–1, R2–2, R4–1, R5–1 and R6–2, and these relays release. The release of either of relays R5–1 and R2–2 breaks the circuit for relay R7–1, and the connection from the selective switching circuit SW to the master recorder A1 is returned to the output leads of the recorder over the break contacts of relay R7–1. The circuit is now ready to perform another change initiated by any of the operators.

It will be seen that if the operator had wanted to change the recording with respect to bedrooms, she would have pressed the K1–2 key which would have operated the R1–2 relay instead of the R1–1 relay, and if she had wished to change the recording with respect to drawing rooms, she would have pressed the K1–3 key which would have operated the R1–3 relay in a similar circuit. It will be appreciated that other types of space might be represented similarly by additional keys and corresponding additional relays of the R1 group. No matter which of these keys is depressed, however, the R4–1 relay will operate, thus operating the green light 1 at that operator's position and the red light 2′, 2″ etc. at all of the other operators' positions. If the operator had desired to indicate that no more space was available for the particular type of space, she would have depressed the KA–1 key, instead of the KA–2 key, which would have operated the R2–1 relay, or if there was plenty of space available, and the operator wished to change the recording to so indicate, she would depress the key KA–3 which would operate the relay R2–3. There may of course be as many of the KA series of keys as there are quantity units which are to be applied to the master recorders.

As clearly shown in Fig. 2, the corresponding keys at each position are multipled together. Thus the lower contact of the key K1–1 which operates relay R1–1 is multipled to the lower contacts of keys K2–1 in the second position, K3–1 in the third position, and similarly to all other positions. Thus any one of the positions by pressing the corresponding key may operate the R1–1 relay in order to set up the connections for the item-selective circuit T1. Similarly all of the quantity keys are multipled together in the different positions so that the operator in any one may operate any of the R2 relay series by depressing the proper key.

If any operator depresses one of the K1 keys designating the type of space and fails to depress the quantity key, the green light will light and will remain lit since it cannot be put out until the R4–1 relay is unlocked by the removal of ground at the CX cam, and this will not take place until the particular quantity has been recorded on the master recorder. The operator will thus realize that the operation has not been completed and will complete it by depressing the proper quantity key.

The operation of a quantity key alone will merely operate one of the R2 relays which will release when the quantity key is released.

Although the response of the item-selective circuit has been described as controlled by a frequency which is produced by the master recorder, other signals for this selection might be used if desired. Thus, pulses might be used or combinations of pulses and frequencies. Five pulses of different frequency in combination would give 32 selections, or 6 pulses would give 64 selections. Also the use of time spaced pulses of the same frequency might be used if desired. Also where the master recorder contains a rotating element, such as a magnetic drum, the angular position of the drum or element which corresponded to the particular type of space on the record might be used to operate a switch which would connect the particular relay of the R5 group to initiate the operation of the recording circuit.

While the invention has been disclosed in connection with a railroad reservation system it is to be understood that it is not limited to such a system but might be used wherever certain signals which are subject to change are recorded to provide a source of information. For instance, the invention might be used for recording of stock exchange prices, charge account records or stock records where the "lumping" and emergency message requirement of reservations do not occur, or if emergency messages are required to be used, these can be of stereotyped design, such as "double order," "record urgent." Therefore, while I have described above the principles of my invention in connection with specific apparatus, it is to be clearly understood that this description is made only by way of example and not as a limitation to the scope of my invention.

What is claimed:

1. In a recording system an operator's position, a master recorder having input and output circuits and having the quantity designations of a plurality of different items recorded in succession at predetermined positions thereon, each with an item-identifying coded signal recorded on said master recorder preceding the quantity designation, a plurality of item-selective circuits, means at the operator's position for selectively connecting one of said circuits to the output circuit of said master recorder, a plurality of auxiliary recorders, each with a different recorded quantity, means at said operator's position for selectively connecting one of said auxiliary recorders to said master recorder, means in each item-selective circuit for responding to the coded signal associated with the respective item, and means controlled by said last-mentioned means for transferring the connection of said selected auxiliary recorder from the output to the input circuit of said master recorder and for operating said selected auxiliary recorder to replace the quantity recorded on said master recorder with that produced by said selected auxiliary recorder at the same position thereon at which the replaced quantity was recorded.

2. In a recording system, the combination, as defined in claim 1, in which there are a plurality of master recorders, and further comprising a selective switching circuit, and means at the operator's position for operating said selective switching circuit to connect a selected item-selective circuit with a desired one of said master recorders.

3. In a recording system, the combination, as defined in claim 2, in which the means at the operator's position for operating the selective circuit to connect one of the item-selective circuits with one of the master recorders comprises a circuit interrupter for generating selection impulses to which said selective circuit is responsive.

4. In a recording system, the combination, as defined in claim 1, in which the coded signals recorded on said master recorder are frequencies, there being a different one for each item and the item-selective circuit is responsive to the frequency of the particular item.

5. In a recording system, a plurality of master recorders, each having a plurality of different, successive items recorded at predetermined positions thereon, each item being followed by a coded signal recorded on its associated recorder, representative of said item, and a quantity, a plurality of item-selective circuits, there being one for each item recorded on said master recorders, each of said circuits including means responsive to the coded signal representative of a particular item, a plurality of auxiliary recorders each of which has a different quantity recorded on it, a plurality of operators' positions, a selective switch circuit, means at each operator's position for selectively connecting one of said item-selective circuits to said selective switch circuit, means at each operator's position for selectively connecting one of said auxiliary recorders to said selective switch circuit, means at each operator's position for operating said selective switch circuit for selectively connecting one of said master recorders to both said selected item-selecting circuit and said selected auxiliary recorder, whereby said item-selective circuit will receive successive coded signals representing recorded items, and means operated by said item-selective circuit when the particular coded signal is received thereby for causing said connected auxiliary recorder to replace the immediately following quantity recorded on said master recorder with the quantity recorded on said connected auxiliary recorder at the same position thereon at which the replaced quantity was recorded.

6. In a recording system an operator's position, a master recorder having input and output circuits and having a plurality of different items and the quantity designations of said items recorded at predetermined random positions on said recorder by means of voice signals, each item with an item-identifying coded signal outside of the audible range preceding the quantity designation, a plurality of item-selective circuits, means at the operator's position for selectively connecting one of said circuits to the output circuit of said master recorder, a plurality of auxiliary recorders, each with a different quantity recorded by means of voice signals, means at said operator's position for selectively connecting one of said auxiliary recorders to said master recorder, means in each item selective circuit for responding to the coded signal associated with the respective item, and means controlled by said last-mentioned means for transferring the connection of said selected auxiliary recorder from the output to the input circuit of said master recorder and for operating said selected auxiliary recorder to replace the quantity recorded on said master recorder with that produced by said selected auxiliary recorder at the same position thereon at which the replaced quantity was recorded.

7. In a recording system, the combination, as defined in claim 6, in which the coded signals recorded on said master recorder are frequencies, there being a different one for each item and the item-selective circuit is responsive to the frequency of the particular item.

References Cited in the file of this patent

UNITED STATES PATENTS

| | | |
|---|---|---|
| 2,124,906 | Bryce | July 26, 1938 |
| 2,224,244 | Hicks | Dec. 10, 1940 |
| 2,266,779 | Loughridge | Dec. 23, 1941 |
| 2,295,000 | Morse | Sept. 8, 1942 |
| 2,446,037 | Ammann et al. | July 27, 1948 |
| 2,540,654 | Cohen et al. | Feb. 6, 1951 |
| 2,542,890 | Basu et al. | Feb. 20, 1951 |
| 2,549,071 | Dusek et al. | Apr. 17, 1951 |
| 2,558,853 | Kappeler | July 3, 1951 |
| 2,581,056 | Walmsley et al. | Jan. 1, 1952 |
| 2,587,532 | Schmidt | Feb. 26, 1952 |